US012448274B2

(12) United States Patent
Grote et al.

(10) Patent No.: US 12,448,274 B2
(45) Date of Patent: Oct. 21, 2025

(54) SYSTEM UNIT AND METHOD FOR DEICING A SPIGOT OF A PETROL PUMP OF A FILLING STATION DEVICE HAVING SUCH A SYSTEM UNIT

(71) Applicant: Robert Bosch GmbH, Stuttgart (DE)

(72) Inventors: Claus Grote, Ansbach (DE); Matthias Brunner, Kornwestheim (DE)

(73) Assignee: Robert Bosch GmbH, Stuttgart (DE)

( * ) Notice: Subject to any disclaimer, the term of this patent is extended or adjusted under 35 U.S.C. 154(b) by 1 day.

(21) Appl. No.: 18/691,639

(22) PCT Filed: Aug. 11, 2022

(86) PCT No.: PCT/EP2022/072568
§ 371 (c)(1),
(2) Date: Mar. 13, 2024

(87) PCT Pub. No.: WO2023/041264
PCT Pub. Date: Mar. 23, 2023

(65) Prior Publication Data

US 2024/0400372 A1 Dec. 5, 2024

(30) Foreign Application Priority Data

Sep. 17, 2021 (DE) ..................... 10 2021 210 308.1

(51) Int. Cl.
*B67D 7/80* (2010.01)
*B67D 7/78* (2010.01)
*F17C 5/00* (2006.01)

(52) U.S. Cl.
CPC ................. *B67D 7/80* (2013.01); *B67D 7/78* (2013.01); *F17C 5/007* (2013.01); *F17C 2221/012* (2013.01)

(58) Field of Classification Search
CPC ... B67D 7/78; B67D 7/80; F17C 5/007; F17C 2221/012
See application file for complete search history.

(56) References Cited

U.S. PATENT DOCUMENTS 11,499,765 B2 * 11/2022 Werlen .................... F25B 9/008
11,668,438 B2 * 6/2023 Lee ....................... F17C 13/026
141/285

(Continued)

FOREIGN PATENT DOCUMENTS

DE 102016124521 A1 * 6/2018
EP 3486547 A1 5/2019
KR 20170036185 A 4/2017

OTHER PUBLICATIONS

Translation of International Search Report for Application No. PCT/EP2022/072568 dated Feb. 2, 2023 (2 pages).

(Continued)

*Primary Examiner* — Timothy L Maust
(74) *Attorney, Agent, or Firm* — Michael Best & Friedrich LLP

(57) ABSTRACT

A system unit (100) having a tank storage system (20) that can be filled with fuel, a consumer system (101), and a cooling circuit (10), which is connected to the consumer system (101), for cooling the consumer system (101). A latent heat store (30) is arranged in the system unit (100), which latent heat store (30) is in the form of a thermal coupling (33) between the consumer system (101) and the tank storage system (20) or between the tank storage system (20) and the cooling circuit (10).

17 Claims, 3 Drawing Sheets

(56) References Cited

U.S. PATENT DOCUMENTS

| | | | | |
|---|---|---|---|---|
| 11,802,665 | B2 * | 10/2023 | Pollica | B67D 7/145 |
| 2011/0303300 | A1 * | 12/2011 | Menke | B60K 15/03504 220/562 |
| 2018/0266633 | A1 * | 9/2018 | Fujita | F17C 5/007 |
| 2020/0039811 | A1 | 2/2020 | Werlen et al. | |

OTHER PUBLICATIONS

Anonymous, "Phase change Materials (PCM) for passive thermal management in compressed hydrogen storage tank," ip.com, Apr. 7, 2016 (16 pages).

* cited by examiner

SYSTEM UNIT AND METHOD FOR DEICING A SPIGOT OF A PETROL PUMP OF A FILLING STATION DEVICE HAVING SUCH A SYSTEM UNIT

BACKGROUND

The invention relates to a system unit and a method for deicing a spigot of a petrol pump of a filling station device having such a system unit.

Fuel cell systems usually comprise a plurality of fuel cells in a stacked arrangement or a fuel cell stack, also known as a "stack." Fuel cells are electrochemical energy converters. With their help, a fuel, for example hydrogen, can be converted into electrical energy, heat and water in combination with oxygen. The fuel is supplied to an anode and the oxygen to a cathode of the at least one fuel cell. Within the fuel cell, the anode and the cathode are separated from each other by a membrane, preferably a polymer electrolyte membrane (PEM).

Furthermore, a cooling system with a coolant is usually provided to cool the fuel cells.

The fuel cell system is connected to a tank storage system to supply hydrogen to the anode of the fuel cell. This can, for example, comprise several tanks, each with a control valve, which are connected to the fuel cell system via a common line and thus provide the hydrogen required for the fuel cell.

In addition to gaseous hydrogen storage, hydrogen can also be stored in liquid form in the tank storage system. This is also known as LH2 storage (liquid H2 storage). Liquid hydrogen is usually stored at very low temperatures of around −250° C., optionally under pressure.

DE 10 2016 124 521 A1, for example, describes a fuel cell system with a fuel cell, a cooling system and a fuel tank.

SUMMARY

The system arrangement according to the invention has the advantage that the thermal coupling of the tank storage system and a consumer system, such as a fuel cell system, improves the efficiency of the entire fuel cell system in the form of a consumer system and achieves cost savings.

For this purpose, the system unit has a tank storage system that can be filled with fuel and a consumer system. The system unit also has a cooling circuit connected to the consumer system for cooling the consumer system. In addition, a latent heat store is arranged in the system unit, which latent heat store is in the form of a thermal coupling between the consumer system and the tank storage system or between the tank storage system and the cooling circuit.

In this way, the thermal budget of the entire consumer system and the tank storage system can be optimized in a cost-saving manner. Furthermore, this allows a compact design to be achieved, as no additional components are required for cooling or heating system components in the consumer system and/or the tank storage system. The latent heat store is used in addition to existing heat exchanger components in the cooling circuit to dissipate heat from the consumer system and/or the cooling circuit. The latent heat store can also absorb so-called temperature peaks from the consumer system if the cooling capacity of the cooling circuit is not sufficient. For example, the cooling circuit can be reduced by using a latent heat store with a sufficiently large cooling capacity, which can reduce the costs of the consumer system.

In a first advantageous further development, it is provided that the latent heat store is thermally connected to heat exchanger components of the consumer system and/or to heat exchanger components of the cooling system. In this way, the thermal budget of the consumer system can be improved efficiently, for example by dissipating heat from the consumer system towards the latent heat store.

In an advantageous further development, it is provided that the consumer system is in the form of a fuel cell system with at least one fuel cell or as a hydrogen combustion system. In this way, the heat from the fuel cell system or the hydrogen combustion system can be conducted in a structurally simple manner and the heat can thus be used in a thermally efficient manner by means of the latent heat store, for example to heat other components.

In a further embodiment of the invention, it is advantageously provided that the tank storage system has a tank nozzle, which tank nozzle is thermally connected to the latent heat store. Advantageously, the system unit comprises a filling station device, which filling station device has at least one petrol pump with a spigot for filling the tank storage system. Advantageously, the spigot is thermally connected to the latent heat store by means of the tank nozzle of the tank storage system. In this way, the spigot can be thermally connected to the tank nozzle in a structurally simple manner and possible icing on the spigot can be prevented. This also results in an efficient and fast refueling process.

In an advantageous further development, it is provided that the latent heat store has a phase change material, which phase change material has a phase transition, which phase transition can be activated by means of an actuator and thus thermal energy can be released. In this way, the latent heat store can be activated in a structurally simple way to release thermal energy.

In a further embodiment of the invention, it is advantageously provided that the phase transition of the latent heat store can be activated electrically, by pressure or by bending a metal plate by means of the actuator, thus releasing thermal energy.

In a further embodiment of the invention, it is advantageously provided that the phase transition of the latent heat store can be activated as an actuator by opening a tank flap element of the tank storage system, thus releasing thermal energy. This is particularly advantageous for the user of a fuel cell-powered vehicle, as opening the tank flap element not only prepares the refueling process, but also activates the latent heat store and thus establishes a thermal coupling between the petrol pump spigot and the tank nozzle of the tank storage system.

In an advantageous further development, it is provided that the phase change material or the latent heat store is arranged on the tank nozzle. In this way, the heat from the consumer system or the cooling circuit can be fed directly to the tank nozzle in a structurally simple manner, so that the spigot can be heated when the vehicle is refueled.

In a further embodiment of the invention, it is advantageously provided that the latent heat store is arranged between the tank nozzle and the consumer system or the cooling system. This allows the heat to be conducted quickly and efficiently from the consumer system or the cooling circuit towards the tank nozzle in a structurally simple manner, resulting in optimum thermal coupling between the tank storage system and the consumer system or the cooling circuit.

In a further embodiment of the invention, it is advantageously provided that gaseous or liquid fuel, in particular gaseous or liquid hydrogen, can be stored in the tank storage system.

Furthermore, the invention relates to a method for deicing a spigot of a petrol pump of a filling station device with a system unit described above, characterized by the following feature:

Activation of a phase transition of the latent heat store by means of an actuator arranged on the latent heat store by electrical assistance, by pressure or by bending a metal plate in order to release thermal energy and transfer this thermal energy via the tank nozzle to the spigot.

Advantageously, the phase transition of the latent heat store is activated by opening a tank flap element of the tank storage system as an actuator, thus releasing thermal energy.

This is particularly advantageous when refueling via an external filling station device. When refueling fuel cell-powered vehicles, the hydrogen fuel in the tank storage system is brought to a high pressure, for example 700 bar. Heat is generated in the tank storage system due to hydrogen compression. This leads to overheating in the tank storage system and possible damage to the tank storage system due to thermal stresses and decreasing material strength as the temperature rises. To prevent this, the hydrogen is cooled to approx. −40° C. at the filling station device before refueling, so that the temperature rise in the tank storage system is limited to approx. 50° C. during refueling. For the tank nozzle, however, this means that it can freeze to the petrol pump spigot during the refueling process—especially in cold, wet weather. Depending on the ambient temperature, this can either mean that at temperatures of around 10 to 20° C., a user of the filling station device has to wait an average of 15 to 20 minutes until the tank nozzle has thawed by itself. However, it can also lead to permanent icing, especially at temperatures below freezing (<0° C.). By thermally coupling the tank storage system and the tank nozzle with the latent heat store, it is possible to prevent this by thermally connecting the petrol pump spigot to the tank nozzle, which can then be heated. In this way, the full potential of hydrogen refueling can be made available to the user of the filling station device and the number of vehicles to be refueled can also be increased.

In advantageous applications, the system unit can be used in hydrogen-powered vehicles.

BRIEF DESCRIPTION OF THE DRAWINGS

The drawings show exemplary embodiments of a system unit according to the invention with a tank storage system, a fuel cell system in the form of a consumer system and a filling station device. The following are shown.

DETAILED DESCRIPTION

Figure 1:
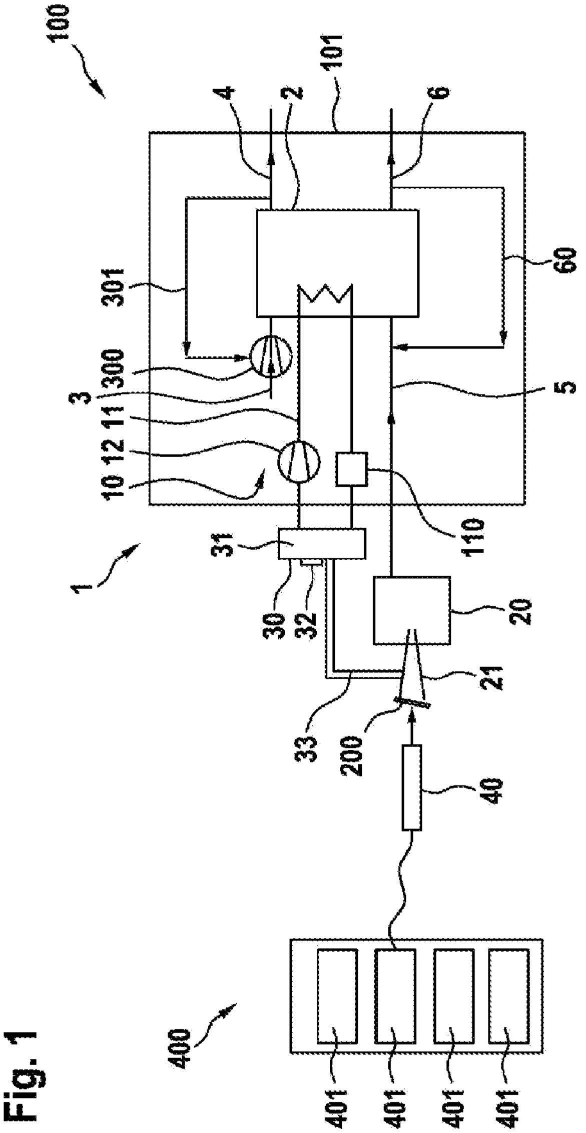
FIG. 1 a schematic view of a first exemplary embodiment of a system unit with a tank storage system, a fuel cell system in the form of a consumer system and a filling station device, FIG. 2 a schematic view of a second exemplary embodiment of a system unit with a tank storage system, a fuel cell system in the form of a consumer system and a filling station device, FIG. 3 a schematic view of a hydrogen-powered vehicle with a system unit with a tank storage system and a consumer system.

FIG. 1 shows a schematic view of a first exemplary embodiment of a system unit 100 with a tank storage system 20, a fuel cell system 1 as a consumer system 101 and a filling station device 400.

The tank storage system 20 provides the fuel required for the fuel cell system 1, in this case hydrogen in liquid or gaseous form and optionally under pressure, to a fuel cell 2 of the fuel cell system 1 via an anode feed line 5. In further embodiments, the tank storage system 20 can comprise several tank containers, which are connected by means of a supply line and thus direct the hydrogen towards the fuel cell system 1. This makes it possible to achieve a tank storage system that can be adapted to the design conditions of the respective consumer system and its application.

The tank storage system 20 can be connected to an external filling station device 400 by means of a tank nozzle 21 integrated in the tank storage system 20, which can be opened and closed with a tank flap element 200. Thus, gaseous or liquid medium, for example hydrogen, can be supplied to the filling station device 400 via petrol pumps 401 by means of a spigot 40 in order to make it available to the consumer system 101, such as the fuel cell system 1.

In addition to the hydrogen, the fuel cell 2 of the fuel cell system 1 is also supplied with air compressed by a compressor 300 via a cathode feed line 3. In fuel cell 2, the hydrogen reacts with the oxygen present in the air to form water. This also releases electrochemical energy and heat, which is used, for example, as an electric drive for fuel cell-powered vehicles.

In this exemplary embodiment, a fuel cell 2 is shown as an example. Typically, fuel cell systems 1 have a plurality of fuel cells 2 in a stacked arrangement or a fuel cell stack, also known as a "stack."

Unused hydrogen is fed out of the fuel cell 2 via an anode drain line 6. In a further embodiment, the unused hydrogen can be fed via an anode recirculation line 60 into the anode feed line 5 for reuse and fed back to the fuel cell 2 with the hydrogen supplied by the tank storage system 20.

Unused air is fed out of the fuel cell 2 via a cathode drain line 4. This can optionally be fed back to the compressor 300 via a cathode recirculation line 301 and thus to the fuel cell 2 via the cathode feed line 3.

Furthermore, the fuel cell 2 has a cooling circuit 10. Coolant is fed through the fuel cell 2 via cooling lines 11 using a pump 12 to cool the fuel cell 2. In addition to the cooling circuit 10, the pump 12 is also connected to a latent heat store 30, which in turn is connected to the tank storage system 20, in particular to the tank nozzle 21. The latent heat store 30 has a phase change material 31 with a phase transition, which can be activated by means of an actuator 32 and thus release thermal energy. By thermally coupling 33 the latent heat store 30 with heat exchanger components 110 of the cooling circuit 10 and the tank storage system 20, possible freezing due to the fuel, in particular hydrogen, can be avoided.

The latent heat store 30 is a heat store 30 that stores the thermal energy supplied to it in the form of latent heat, for example through a phase change. If the phase change is not yet complete, the temperature of a storage medium in the latent heat store 30 does not rise any further despite the addition of heat. This type of heat store can store large amounts of heat in a small temperature range around the phase change.

Typically, for example, special salts or kerosenes are used as a storage medium in the latent heat store 30 and melted so that energy is absorbed in the form of heat of fusion. The energy in the form of heat is released back into the environment or to the structural components thermally connected to the latent heat store 30 by solidification of the storage medium.

The phase transition of the latent heat store 30 can be activated electrically, by pressure or by bending a metal plate by means of the actuator 32.

In an alternative embodiment, the phase transition of the latent heat store 30 can be activated as an actuator 32 by opening the tank flap element 200 of the tank storage system 20.

Figure 2:
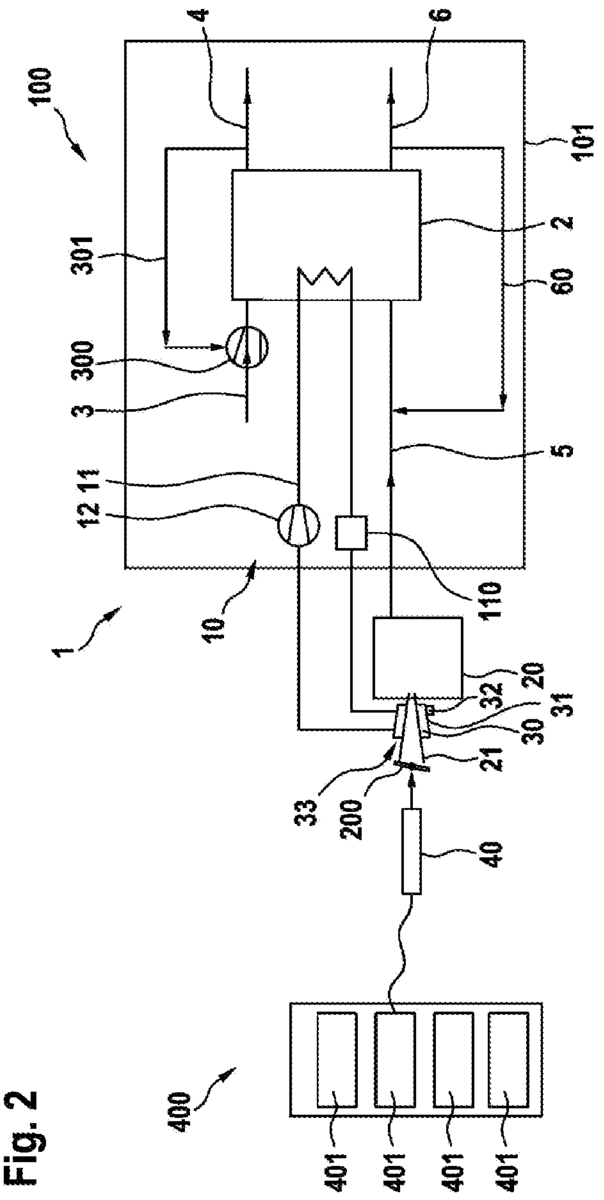

FIG. 2 shows a schematic view of a second exemplary embodiment of a system unit 100 with a tank storage system 20, a fuel cell system 1 as a consumer system 101 and a filling station device 400.

Components with the same function are designated with the same reference number as in the first exemplary embodiment.

The structure and mode of operation of the second exemplary embodiment essentially corresponds to the first exemplary embodiment. The difference between the second exemplary embodiment and the first exemplary embodiment is that here the latent heat store 30 or the phase change material 31 is arranged directly on the tank nozzle 21, so that the thermal coupling 33 between the phase change material 31 and the tank nozzle 21 is optimized as much as possible by achieving the highest possible heat conduction.

The system unit 100 described in the first exemplary embodiment and the second exemplary embodiment is operated for deicing structural components coming into contact with a gaseous or liquid medium, in particular hydrogen, using a method for deicing a spigot 40 of a petrol pump 401 of a filling station device 400.

The method has the following feature:

Activation of a phase transition of the latent heat store 30 by means of the actuator 32 arranged on the latent heat store 30 by electrical assistance, by pressure or by bending a metal plate in order to release thermal energy and transfer this thermal energy via the tank nozzle 21 to the spigot 40.

Advantageously, the phase transition of the latent heat store 30 is activated by opening the tank flap element 200 of the tank storage system 20 as actuator 32, thus releasing thermal energy, as it can be assumed that a refueling process is imminent. For example, freezing of the tank nozzle 21 to the spigot 40 of the petrol pump 401 of the filling station device 400 can thus be reliably prevented.

There is also sufficient time between two refueling processes to convert the phase change material 31 back to its initial—usually solid—state using thermal energy. For this purpose, heat loss from the fuel cell system 1 is used by thermally coupling the phase change material 31 to the cooling circuit 10 of the fuel cell system 1.

In addition to the fuel cell system 1 shown in the exemplary embodiments, other consumer systems 101 such as a hydrogen combustion system 1' can also be used in the system unit 100.

Figure 3:
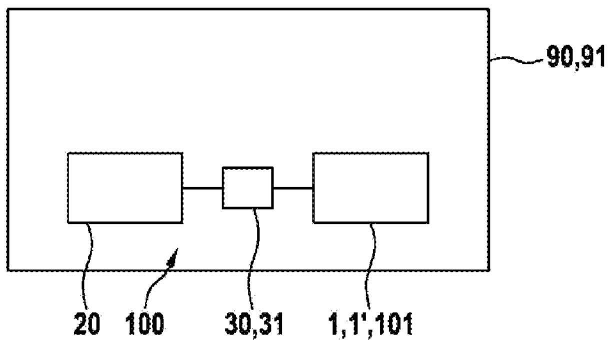

The system unit 100 described in the exemplary embodiments with the tank storage system 20, the fuel cell system 1 and the latent heat store 30 or the phase change material 31 can be used, for example, in fuel cell-powered vehicles 90 or, in the case of a hydrogen combustion system 1', in hydrogen-powered vehicles 91, as shown in FIG. 3.

What is claimed is:

1. A system unit (100) having a tank storage system (20) configured to receive fuel, a consumer system (101) and a cooling circuit (10) connected to the consumer system (101) for cooling the consumer system (101), wherein a latent heat store (30) is arranged in the system unit (100), the latent heat store (30) being configured as a thermal coupling (33) between the consumer system (101) and the tank storage system (20) or between the tank storage system (20) and the cooling circuit (10), wherein the system unit (100) includes heat exchanger components (110), and wherein the latent heat store (30) is thermally connected to the heat exchanger components (110) such that the latent heat store (30) is configured to receive heat from the heat exchanger components (110).

2. The system unit (100) according to claim 1, wherein the consumer system (101) is configured as a fuel cell system (1) with at least one fuel cell (2) or as a hydrogen combustion system (1').

3. The system unit (100) according to claim 1, wherein the tank storage system (20) has a tank nozzle (21) that is thermally connected to the latent heat store (30).

4. The system unit (100) according to claim 3, wherein the system unit (100) comprises a filling station device (400) that has at least one petrol pump (401) with a spigot (40) for filling the tank storage system (20).

5. The system unit (100) according to claim 4, wherein the spigot (40) is thermally connected to the latent heat store (30) by the tank nozzle (21) of the tank storage system (20).

6. The system unit (100) according to claim 5, wherein the latent heat store (30) has a phase change material (31) that has a phase transition, wherein the phase transition is configured to be activated by an actuator (32) to release thermal energy.

7. The system unit (100) according to claim 6, wherein the phase transition of the latent heat store (30) is configured to be activated electrically, by pressure or by bending a metal plate by the actuator (32), and thermal energy is configured to be released.

8. The system unit (100) according to claim 6, wherein the phase transition of the latent heat store (30) is configured to be activated by opening a tank flap element (200) of the tank storage system (20) to release thermal energy.

9. The system unit (100) according to claim 6, wherein the phase change material (31) or the latent heat store (30) is arranged on the tank nozzle (21).

10. The system unit (100) according to claim 5, wherein the latent heat store (30) is arranged between the tank nozzle (21) and the consumer system (101) or the cooling circuit (10).

11. The system unit (100) according to claim 1, wherein gaseous or liquid fuel is configured to be stored in the tank storage system (20).

12. A method for deicing a spigot (40) of a petrol pump (401) of a filling station device (400) with the system unit (100) according to claim 1, the method comprising:

activating a phase transition of the latent heat store (30) by an actuator (32) arranged on the latent heat store (30) by electrical assistance, by pressure or by bending a metal plate to release thermal energy and transfer the thermal energy via a tank nozzle (21) to a spigot (40).

13. The method according to claim 12, wherein a phase transition of the latent heat store (30) is activated by opening a tank flap element (200) of the tank storage system (20) to release thermal energy.

14. A hydrogen-powered vehicle (90, 91) with the system unit (100) according to claim 1.

15. The system unit (100) according to claim 7, wherein the phase transition of the latent heat store (30) is configured to be activated by opening a tank flap element (200) of the tank storage system (20) to release thermal energy.

16. The system unit (100) according to claim 11, wherein the gaseous or liquid fuel is gaseous or liquid hydrogen.

17. The system unit (100) according to claim 3, wherein the latent heat store (30) is spaced from the tank storage system (20).

* * * * *